United States Patent

Zhu et al.

[19]

[11] Patent Number: 5,560,846
[45] Date of Patent: Oct. 1, 1996

[54] ROBUST CERAMIC AND METAL-CERAMIC RADIANT HEATER DESIGNS FOR THIN HEATING ELEMENTS AND METHOD FOR PRODUCTION

[75] Inventors: Naiping Zhu; Jainagesh A. Sekhar, both of Cincinnati, Ohio

[73] Assignee: Micropyretics Heaters International, Cincinnati, Ohio

[21] Appl. No.: 85,313

[22] Filed: Jun. 29, 1993

Related U.S. Application Data

[63] Continuation-in-part of Ser. No. 27,710, Mar. 8, 1993.
[51] Int. Cl.[6] ............................. H05B 3/40; H05B 3/08
[52] U.S. Cl. ............................. 219/534; 219/541
[58] Field of Search ............................. 219/541, 543, 219/552, 553, 449, 463, 465, 467, 468, 534; 392/438, 439

[56] References Cited

U.S. PATENT DOCUMENTS

| | | | |
|---|---|---|---|
| 1,816,660 | 7/1931 | Shaw | 219/553 |
| 1,986,636 | 1/1935 | Holinger | 219/541 |
| 3,090,094 | 5/1963 | Schwartzwalder et al. | 25/156 |
| 3,097,930 | 7/1963 | Holland | 25/156 |
| 3,111,396 | 11/1963 | Ball | 25/156 |
| 3,269,806 | 8/1966 | Fitzer et al. | 219/553 |
| 3,316,390 | 4/1967 | Gaugler et al. | 219/464 |
| 3,345,440 | 10/1967 | Googin et al. | 264/29 |
| 3,548,359 | 12/1970 | Kuwayama et al. | |
| 3,617,358 | 11/1971 | Dittrich | 117/105.2 |
| 3,705,791 | 12/1972 | Bredzs | 29/195 |
| 3,726,643 | 4/1973 | Merzhanov et al. | 423/409 |
| 3,735,328 | 5/1973 | Yagi | |
| 3,778,249 | 12/1973 | Benjamin et al. | 25/0.5 BC |
| 3,893,917 | 7/1975 | Pryor et al. | 210/69 |
| 3,912,905 | 10/1975 | Giler | 219/464 |
| 3,947,363 | 3/1976 | Pryor et al. | 210/510 |
| 3,962,081 | 6/1976 | Yarwood et al. | 210/69 |
| 3,969,696 | 7/1976 | Wolfe et al. | 219/541 |
| 4,024,056 | 5/1977 | Yarwood et al. | 210/69 |
| 4,081,371 | 3/1978 | Yarwood et al. | 210/69 |
| 4,217,948 | 8/1980 | Merzhanov et al. | 164/115 |

(List continued on next page.)

FOREIGN PATENT DOCUMENTS

| | | |
|---|---|---|
| 0126555 | 11/1984 | European Pat. Off. . |
| 0192602 | 8/1986 | European Pat. Off. . |
| 0404943 | 1/1991 | European Pat. Off. . |
| 1173804 | 4/1957 | France . |
| 864318 | 6/1959 | United Kingdom . |
| 966177 | 7/1963 | United Kingdom . |

OTHER PUBLICATIONS

J. W. McCauley et al. "Simultaneous Preparation . . . ", Ceramic Engineering, 3 (1982), pp. 538–554.
R. W. Rice et al., "Effects of Self–Propagating . . . " Ceramic Engineering, 7 (1986), pp. 737–749.
H. C. Yi, Journal Materials Science, 25 (1990) pp. 1159–1168.
C. H. Samans "Powder Metallurgy", American Society For Metals, Metals Handbook, 1948, pp. 47–52.

*Primary Examiner*—Teresa J. Walberg
*Assistant Examiner*—Sam Paik
*Attorney, Agent, or Firm*—Dinsmore & Shohl

[57] ABSTRACT

A heating element assembly design and methods of densification of such designs are disclosed for radiant heating devices, specifically adapted to avoid breakage of or damage to the heating elements. The design includes a first support having a first and a second surface, the first surface being exposed directly to the atmosphere. The design further includes at least one ceramic or metal ceramic electrical terminal, having a first and a second surface; at least one ceramic or metal ceramic heating element with a diameter of up to 12 millimeters, the heating element being connected to the second surface of the terminal, and not being in direct contact with the first support so as to cushion the heating element from forces acting upon the first support. The first surface of the terminal being closer to the first support than the heating element, and adapted to absorb some of the forces acting upon the first support so as to further cushion the heating elements.

6 Claims, 2 Drawing Sheets

U.S. PATENT DOCUMENTS

| | | | |
|---|---|---|---|
| 4,257,810 | 3/1981 | Narumiya | 106/42 |
| 4,258,099 | 3/1981 | Narumiya | 428/311 |
| 4,266,119 | 5/1981 | Best | 219/541 |
| 4,267,435 | 5/1981 | Best | 219/552 |
| 4,272,639 | 6/1981 | Beck | 373/131 |
| 4,374,761 | 2/1983 | Ray | 252/519 |
| 4,391,918 | 7/1983 | Brockmeyer | 501/127 |
| 4,405,433 | 9/1983 | Payne | 204/225 |
| 4,455,211 | 6/1984 | Ray et al. | 204/293 |
| 4,459,363 | 7/1984 | Holt | 501/96 |
| 4,596,637 | 6/1986 | Kozarek et al. | 204/67 |
| 4,600,481 | 7/1986 | Sane et al. | 204/67 |
| 4,678,548 | 7/1987 | Brown | 204/67 |
| 4,678,760 | 7/1987 | Ray | 501/96 |
| 4,680,094 | 7/1987 | Duruz | 204/67 |
| 4,697,632 | 10/1987 | Lirones | 164/369 |
| 4,699,763 | 10/1987 | Sinharoy et al. | 419/11 |
| 4,710,348 | 12/1987 | Brupbacher et al. | 420/129 |
| 4,747,873 | 5/1988 | Kamioka | 75/229 |
| 4,751,048 | 6/1988 | Christodoulou et al. | |
| 4,772,452 | 9/1988 | Brupbacher et al. | 420/129 |
| 4,774,052 | 9/1988 | Nagle et al. | 420/129 |
| 4,800,065 | 1/1989 | Christodoulou et al. | 420/129 |
| 4,808,372 | 2/1989 | Koczak et al. | 420/457 |
| 4,836,982 | 6/1989 | Brupbacher et al. | 420/129 |
| 4,865,701 | 9/1989 | Beck et al. | 204/67 |
| 4,900,698 | 2/1990 | Lundsager | 501/80 |
| 4,902,457 | 2/1990 | Wada et al. | 264/43 |
| 4,904,424 | 2/1990 | Johnson | 264/566 |
| 4,909,842 | 3/1990 | Dunmead et al. | 75/236 |
| 4,915,903 | 4/1990 | Brupbacher et al. | 429/128 |
| 4,915,905 | 4/1990 | Kampe et al. | 420/418 |
| 4,948,676 | 8/1990 | Darracq et al. | 428/539 |
| 4,948,761 | 8/1990 | Hida | 501/89 |
| 4,957,885 | 9/1990 | Hida | 501/89 |
| 4,961,778 | 10/1990 | Pyzik et al. | 75/230 |
| 4,965,044 | 10/1990 | Miyamoto et al. | 419/12 |
| 4,975,191 | 12/1990 | Brockmeyer et al. | 210/510 |
| 4,985,202 | 1/1991 | Moshier et al. | 420/590 |
| 4,988,480 | 1/1991 | Merzhanov et al. | 419/11 |
| 4,990,295 | 2/1991 | Hida | 264/65 |
| 5,006,290 | 4/1991 | Hida | 264/65 |
| 5,015,343 | 5/1991 | LaCamera et al. | 204/67 |
| 5,019,454 | 5/1928 | Busse | 428/570 |
| 5,022,991 | 6/1991 | Day et al. | 210/506 |
| 5,030,600 | 7/1991 | Hida et al. | 501/98 |
| 5,032,332 | 7/1991 | Hida et al. | 214/65 |
| 5,071,533 | 12/1991 | de Nora et al. | 204/243 |
| 5,071,797 | 12/1991 | Hida | 501/87 |
| 5,143,668 | 9/1992 | Hida | 264/63 |
| 5,145,619 | 9/1992 | Abramovici | 264/60 |
| 5,149,677 | 9/1992 | Merzhanov et al. | 501/96 |
| 5,158,655 | 10/1992 | Townsend | 204/67 |
| 5,188,678 | 2/1993 | Sekhar et al. | 148/514 |
| 5,217,583 | 6/1993 | Sekhar et al. | 204/67 |

ROBUST CERAMIC AND METAL-CERAMIC RADIANT HEATER DESIGNS FOR THIN HEATING ELEMENTS AND METHOD FOR PRODUCTION

This application is a continuation-in-part application of application Ser. No. 08/027,710, filed on Mar. 8, 1993.

FIELD OF THE INVENTION

The present invention provides robust designs and methods of densification of such designs for heaters utilizing ceramic and metal-ceramic heating elements. More specifically, this invention provides designs for heaters using heating elements of thin to medium thickness. In an additional aspect of this invention a novel improvement is provided in a method for joining electrical heating elements to supports and terminals, (the word "terminal" is intended to connote the same meaning as the word "connector" as understood by one skilled in the art and these two terms has been used interchangeably) whereby the joined products are densified for effective use at high temperatures and thus made robust.

BACKGROUND OF THE INVENTION

Ceramic and ceramic composite heating wires are brittle in comparison to metallic wires. Yet they are preferred to metallic heating elements on account of both a higher resistivity and a much higher temperature of possible use. Typical ceramic heating element wires are made out of $MoSi_2$, $SiC$, $WSi_2$, $ZrO_2$, etc., sometimes composited with $Al_2O_3$, $SiO_2$, etc.

Metallic heating elements wires, on account of their ductility and lower temperatures of use, may often be coiled and embedded in refractories to facilitate easy application and unit wise repair. On account of their high ductility, the metallic heating wires (typically containing Ni, Cr, Al, Fe, etc.) may be easily configured into the required furnace design without much effort and thought.

On the other hand when designing furnaces with ceramic/ceramic composite heating elements (hereinafter called cerheaters) the design of the furnace configuration must take into account the following factors: 1. creep (deformation of an article at high temperatures under its own weight); 2. reactivity with refractories; 3. extreme brittleness of heating elements at low temperatures; 4. large change in resistivity with temperature; 5. atmosphere of use; 6. connectors; 7. thermal fatigue; 8. thermal expansion; 9. lorentz force repulsion. Thus it can be seen that the cerheater design is often very complex and involved.

The problem of design becomes even more severe in applications which require use of elements having thicknesses (i.e., the diameter of heating element wires) less than 12 mm, especially in the range of 1 to 2 min. At such small thickness, the brittleness problems and problems associated with creep, become more pronounced. Thin wires are preferred in furnace design because the amount of current required (electricity) and associated component costs significantly diminish for the same temperature and wattage of the furnace, for reduced thickness elements when compared to elements having larger thickness.

To date, the typical use of cerheaters made from, for e.g., $MoSi_2$, have been in the hanging U configuration. As $MoSi_2$ is prone to large expansion and creep (especially when the heating zone of the element is long), this configuration has been deemed most appropriate for use in high temperature furnaces. On account of the relative inflexibility of available shapes, prior to the methods of manufacture described in U.S. Ser. No. 07/847,782 ("the '782 application") filed Mar. 5, 1992 and U.S. Ser. No. 08/028,354 ("the '354 application") filed on Mar. 9, 1993, this design has remained the preferred design. These two applications are hereby incorporated by reference in their entirety.

Now on account of finer wires and complex shapes available using the methods of the '782 application and the '354 application, there is a need for better and more efficient designs for heating elements which avoid damage/breakage during use and during shipping. The present invention includes some such designs where thin wires may be used at medium to high temperatures while overcoming the problems of brittleness, thermal expansion, creep, contacts etc. There is also included in the present invention, an improvement in a method for joining electrical heating elements to terminals and supports, whereby the joined products are densified for effective robust use at high temperatures.

SUMMARY OF THE INVENTION

It is a primary object of the present invention to provide novel radiant heater designs, which designs are better and more efficient in avoiding damage/breakage of thin heating elements during use and shipping.

It is an additional object of the present invention to provide a novel improvement in a method for joining electrical heating elements to terminals and supports, whereby the joined products are densified for effective use at high temperatures thus making them robust.

In accordance with the first aspect of the present invention, there is provided a heating element assembly design for radiant heating devices, specifically adapted to avoid breakage of or damage to the heating elements, the design comprising a first support means having a first and a second surface, said first surface being exposed directly to the atmosphere; at least one ceramic or metal ceramic electrical terminal, having a first and a second surface; at least one ceramic or metal ceramic heating element with a diameter of up to 12 millimeters, said heating element being connected to said second surface of said terminal, and not being in direct contact with said first support means so as to cushion said heating element from forces acting upon said first support means; and said first surface of said terminal being closer to said first support means than said heating element, and adapted to absorb some of the forces acting upon said first support means, so as to further cushion said heating elements.

In accordance with the second aspect of the present invention, an improvement method is provided in a method for joining micropyretically synthesized ceramic or metal ceramic electrical heating elements to electrical terminals and supports, comprising the steps of preparing the electrical terminals and supports by blending a mixture comprising between about 5% and 95% by weight of at least one reactive system, wherein said reactive system comprises at least two particulate combustible materials which will react exothermically with one another by micropyretic synthesis and are present in such proportion to one another that combustion will occur when ignited, upto 95% by weight of a filler material, and a sufficient amount of a liquid phase in order to form a slurry and fashioning said slurry into a desired wet and uncombusted shape for said terminal and support; placing said heating element into close contact with said wet, uncombusted terminal and support so as to attach said terminal and support to said element; drying the terminal and support portion of the terminal and support-to-element attachment; and combusting the terminal and support portion of said terminal and support-to-element attachment by ignition at a temperature between about 150° C. and 1800° C. The improvement is for the purpose of densifying the terminals and supports sufficiently for use at high temperatures, by placing said attachment in an induction coil or furnace maintained at temperatures slightly higher than the use temperature.

DETAILED DESCRIPTION OF THE PREFERRED EMBODIMENT

Figure 1:
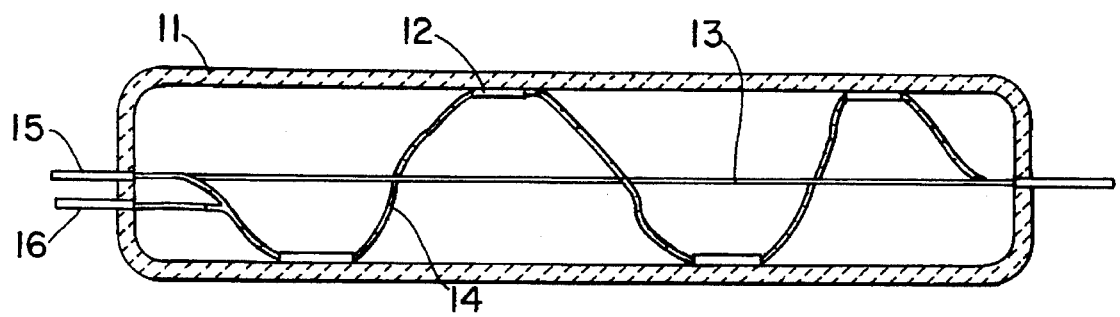
FIG. 1 shows a schematic of a quartz tube cerheater design.

The design of FIG. 1 termed the quartz tube cerheater design, and represented generally by the numeral 10, is best adapted for applications like hot plates, toaster, ovens, etc. The design of FIG. 2 termed the ceramic disc cerheater design, and represented generally by the numeral 20, is also best suited for the above applications.

In FIG. 1, a quartz tube heater is generally represented by the numeral 11. The terminals which are connected to the walls of the quartz tube are represented by the numeral 12. 13 represents the ballast wire for connecting the heater 11 to a power supply. The plurality of heating elements are represented by the numeral 14. The outside terminal for current for the ballast 13 is represented by 15 and the outside terminal for current for the cerheater 11 is shown by 16. The holder made of non-conductive material, for the elements 14 is shown by 17.

Figure 2:
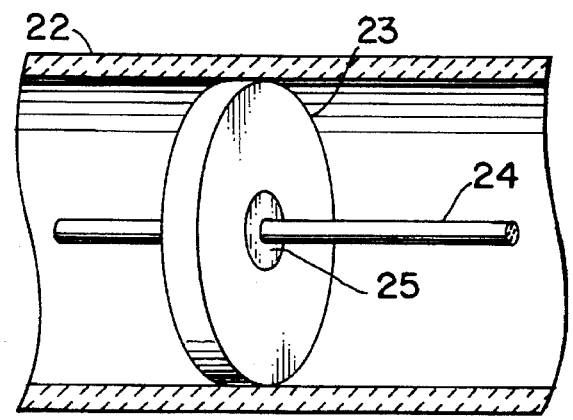
FIG. 2 shows a schematic of a ceramic disc cerheater design.

In FIG. 2, a quartz tube or a tube of non-transparent material with cut sections to allow radiation to pass through is shown generally by the numeral 22. A disc made of a non-conductive material selected from the group consisting of silica, alumina silicate and pure alumina is shown generally by the numeral 23. The disc 23 provides additional support to the heating element. The terminal 25 is located in an annular opening within the disc 23. The heating element 24 is located in an annular opening in the terminal 25.

These two designs may be readily manufactured using the following steps:
1. Make a suitable heating element 14 in wavy form having a thickness of as low as 1 mm, utilizing the method taught in the '782 application and the densification method of U.S. Ser. No. 08/027,710, filed on Mar. 8, 1993 ("the '710 application"). The '710 application is hereby incorporated by reference in its entirety.
2. Attach several heating elements 14 to terminals 12 according to the '354 application.
3. Attach end terminals 15 as described in the '354 application.
4. Now place in quartz tube 11 such that only the terminal areas 12 touch the tube wall as shown in FIG. 1 or the $SiO_2$ or other ceramic disc 23 as shown in FIG. 2. This arrangement eliminates direct impact on the heating elements 14, 24 during use or shipping, thereby dramatically increasing the useful life of the heating elements. When energized, the heating elements 14, 24 will glow whereas the terminals 12, 25 will remain cold. This will ensure that there is no reactivity where the terminals 12, 25 touch the quartz 11, 23, and yet that no outside impact or jarring can break the wire. When used in series with a metallic ballast wire, such a system may be directly plugged into a 110V or 220V supply directly, thus removing if required the need for expensive controllers and transformers.
5. The quartz tube may be replaced by non-transparent tubes (made, for example, of $Al_2O_3$, $ZrO_2$ and Mullite, semiconductor materials such as CdGeAg or electrically conducting materials such as molybdenum-di-silicide and combinations thereof) provided these are cut so as to allow radiation to escape. The terminal areas may be of similar composition as the heating element or may use different materials in the fashion of the design shown in FIG. 1.

Figure 3:
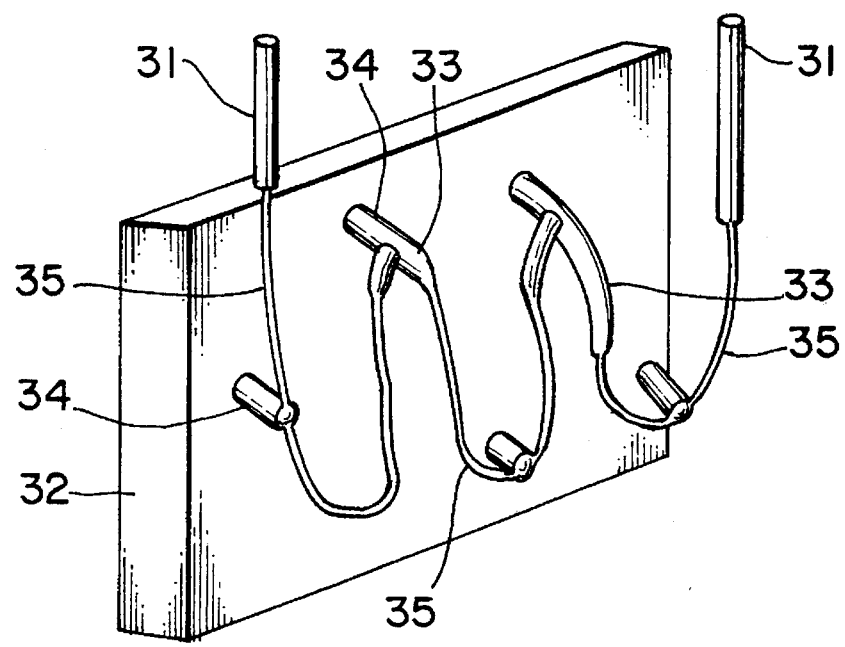
FIG. 3 shows a schematic of a U-shaped cerheater design.

The design shown in FIG. 3 termed the U-shaped cerheater design and represented generally by the numeral 30 is best suited for use in applications such as furnaces, cooking hubs, etc. In FIG. 3, a refractory wall is shown generally by the numeral 32. The wall 32 would normally form a part of a furnace or cooking hub. A plurality of members 34 which may or may not have the same/similar composition as terminals 33, are attached to wall 32 as shown above. The members 34 protrude above the surface of the wall 32. A plurality of the terminals 33 are attached to the protruding portions of members 34. Consecutive terminals 33 are located alternatively at upper and lower levels of wall 32. Between successive terminals 33, are located a plurality of heating elements 35. End terminals 31 are used to connect the heating elements to a source of power.

The U-shaped design may be readily manufactured using the following steps:
1. Make several U shaped heating elements 35 in wavy form each having a diameter as low as 2 mm, utilizing the method taught in the '782 application and densified according to method in the '710 application.
2. Now attach the terminals 33 to the back panel 32. Attach the elements 35 to the green terminals 33 as described in the '354 application. The same compositions as used for the heating elements 35 may be used for the terminals 33, which will allow the cerheater to be used at high temperatures including temperatures above 1500° C.

The method of joining terminals as taught in the '354 application is not adequate for very high temperature applications, for instance, above 1500° C. The following further processing steps are disclosed for joining terminals or supports to heating elements for use in high temperature applications, which steps can be used for all the designs taught in this application.
1. Place the whole system in an induction coil of required strength and soak at temperatures slightly higher than the use temperature for at least ¼ hour. This step will densify the internal terminals 33 enough to be used at high temperatures.
2. Now insert the terminals 33 into a prefabricated depression in the refractory 32 if the refractory is a hard refractory or push the terminals 33 against the refractory 32 if the refractory is a soft refractory. The terminals will be held at the refractory wall by cementing or the like. At very high temperatures the terminals 33 may react with the refractory 32 but the terminal is at a significant distance away from the main current carrying member. A ballast in series will allow the design to be directly plugged into 110V or 220V supplies.

Figure 4:
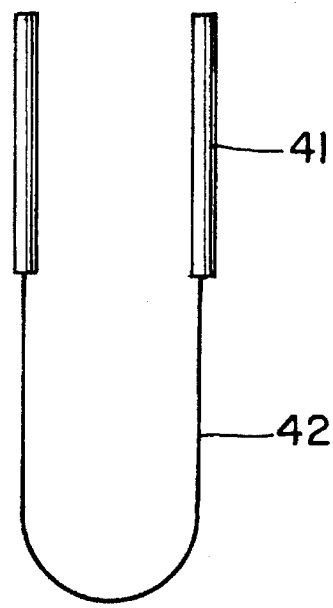
FIG. 4 shows a schematic of a prior art radiant heater design having a hanging U configuration.

The design shown at FIG. 4, is one of a prior art radiant heater, having a hanging U configuration. The electrical terminal or support is shown generally by the numeral 41 and 42 depicts the heating element. As can be clearly seen, forces acting on the support or terminal 41 would also act, quite directly on the element 42. If the element is a thin one, such as those in the present application, it would be very susceptible to damage/breakage, either during transport, storage or use.

Thus it is apparent that there have been provided, in accordance with the invention, designs for robust designs for heaters using heating elements of thin to medium thickness and an improvement in a method for joining electrical heating elements to terminals and supports, whereby the joined products are densified for effective use at high temperatures, which fully satisfy the objects, aspects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations which fall within the spirit and broad scope of the appended claims.

We claim:

1. A heating element assembly for a radiant heating device, specifically adapted to avoid breakage of or damage to the heating elements, the assembly comprising:

a first support means having an inside surface and an outside surface;

at least one ceramic or metal ceramic electrical connector, having a first and a second surface;

at least two ceramic or metal ceramic heating elements with a diameter of up to 12 millimeters, said heating elements being connected to opposite ends of said second surface of said connector, and not being in direct contact with said first support means; and said first surface of said connector being closer to said first support means than said heating elements, and adapted to absorb some of the forces acting upon said first support means.

2. The heating element assembly design of claim 1, wherein said first support means is formed of a material selected from the group consisting of quartz, a transparent material, cut sections of transparent or opaque materials to allow radiation to escape and combinations thereof.

3. The heating element assembly design of claim 2, wherein said non-transparent material is selected from the group consisting of $Al_2O_3$, $ZrO_2$, or CdGeAg, Mullite and combinations thereof.

4. The heating element assembly design of claim 1, wherein said first support means is, wall of a tubular enclosure, the first surface of a plurality of said connectors being attached to the second surface of said wall, consecutive connectors being located on opposite sides of said enclosure with both said surfaces of a plurality of said heating elements being located between and connected to consecutive connectors.

5. The heating element assembly design of claim 1, adapted to be directly plugged into the line voltage.

6. The heating element assembly design of claim 1, wherein the diameter of said heating elements is in the range of about 1 to 2 mm.

* * * * *